(12) United States Patent
Bauer et al.

(10) Patent No.: US 7,979,525 B2
(45) Date of Patent: *Jul. 12, 2011

(54) METHOD AND APPARATUS FOR CONFIGURING AND MODELING SERVER INFORMATION IN AN ENTERPRISE TOOLING ENVIRONMENT

(75) Inventors: Kevin Michael Bauer, Apex, NC (US); Timothy Gerrit Deboer, Toronto (CA); George Paul DeCandio, Cary, NC (US); Jianjun Zhang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 470 days.

This patent is subject to a terminal disclaimer.

(21) Appl. No.: 12/190,435

(22) Filed: Aug. 12, 2008

(65) Prior Publication Data
US 2008/0301268 A1 Dec. 4, 2008

Related U.S. Application Data

(63) Continuation of application No. 11/213,237, filed on Aug. 26, 2005, now Pat. No. 7,454,492.

(51) Int. Cl.
G06F 15/177 (2006.01)
G06F 15/173 (2006.01)
(52) U.S. Cl. ........................................ 709/223; 709/220
(58) Field of Classification Search ........... 709/220–225
See application file for complete search history.

(56) References Cited

U.S. PATENT DOCUMENTS

| 6,721,777 | B1 | 4/2004 | Sharma |
| 7,370,075 | B2 | 5/2008 | Farquharson et al. |
| 7,383,332 | B2 | 6/2008 | Chong et al. |
| 7,389,350 | B2 | 6/2008 | Charters et al. |
| 2003/0014554 | A1 | 1/2003 | Williamson et al. |
| 2003/0050932 | A1 | 3/2003 | Pace et al. |
| 2003/0140126 | A1 | 7/2003 | Budhiraja et al. |
| 2004/0078495 | A1 | 4/2004 | Mousseau et al. |
| 2005/0021742 | A1 | 1/2005 | Yemini et al. |

FOREIGN PATENT DOCUMENTS
WO 01/91033 A2 11/2001

*Primary Examiner* — Larry Donaghue
(74) *Attorney, Agent, or Firm* — Cuenot, Forsythe & Kim

(57) ABSTRACT

A computer implemented method, an apparatus, and a computer usable program product are provided for configuring and modeling server connection and deployment information in an enterprise tooling environment. A software model is provided that comprises a connections object, which includes a plurality of connection objects and deploy spec objects. Each of the connection objects is specific to a backend server type. A deploy controller is provided at run time to examine the connections object for a connection object. A backend resource manager is loaded for a specific application server. If a connection object is present, the backend resource manager loads a connection interpreter, which transforms development time connection information in the connection object to the run time connection information in corresponding deploy spec object and connection factory spec object. The backend resource manager then writes the deployment information to the configurations files of the application server.

14 Claims, 6 Drawing Sheets

METHOD AND APPARATUS FOR CONFIGURING AND MODELING SERVER INFORMATION IN AN ENTERPRISE TOOLING ENVIRONMENT

This application is a continuation of application Ser. No. 11/213,237, filed Aug. 26, 2005, status allowed.

BACKGROUND OF THE INVENTION

1. Field of the Invention

The present invention relates generally to a data processing system. In particular, the present invention relates to configuring and modeling server connections in a data processing system. Still more particular, the present invention relates to configuring and modeling server information in an enterprise tooling environment of the data processing system.

2. Description of the Related Art

Currently, application developers use enterprise application development tools, such as, for example, Rational® Application Developer, to develop enterprise applications. An enterprise tooling environment includes an integrated development environment (IDE), a graphical user interface, and a runtime environment that are provided within an enterprise application development tool for developing enterprise applications. Rational® Application Developer is a product available from International Business Machines Corporation. These development tools typically require a connection to be specified at development time in order to connect to backend servers. Backend servers include Enterprise Information Systems, such as, for example, relational database servers, SAP servers, PeopleSoft® servers and Siebel servers. SAP is a product available from SAP AG. PeopleSoft® is a product available from Oracle Corporation. Siebel is a product available from Siebel Systems, Inc.

In addition to a development time connection, these development tools automatically set up runtime connection management configurations, such as connection adapters, based on users' input. Most of the time, the same information that is collected for development time connections may be used to set up run time configurations. Users are not separated from the concerns of setting up runtime configurations when they are in the development phase and no distinctions are drawn between development time and runtime portion of the connection model.

In addition, development time connection information is not exactly in the same format as the run time connection information. For example, the user Id of the development time connection may be called "username", but the user Id of the run time connection may be called "userId".

BRIEF SUMMARY OF THE INVENTION

The aspects of the present invention provide a computer implemented method, an apparatus, and a computer usable program product for configuring and modeling server connection and deployment information in an enterprise tooling environment. A software model comprising a connections object, which includes at least one connection object and at least one deploy spec object. If a connections object is detected at deployment time, a deploy controller is provided to determine whether at least one connection object is present to capture development time connection information specific to a backend server. The deploy controller then loads a backend resource manager specific to an application server to manage run time connections between the application server and the backend server.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
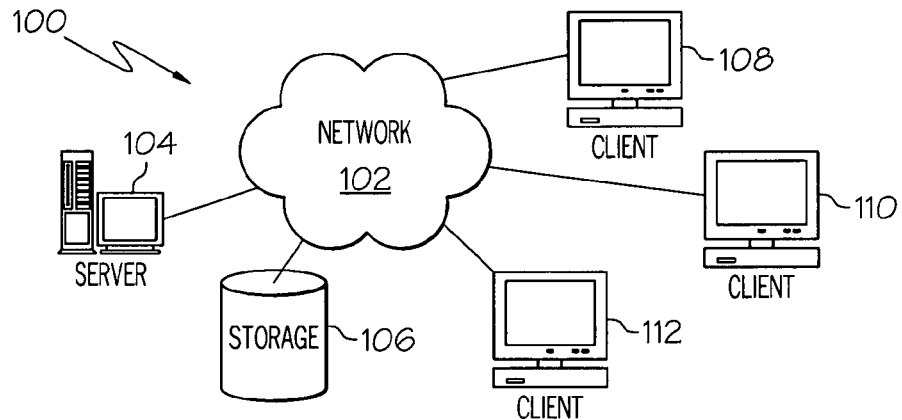
FIG. 1 depicts a pictorial representation of a network of data processing systems in which the present invention may be implemented.
Figure 2:
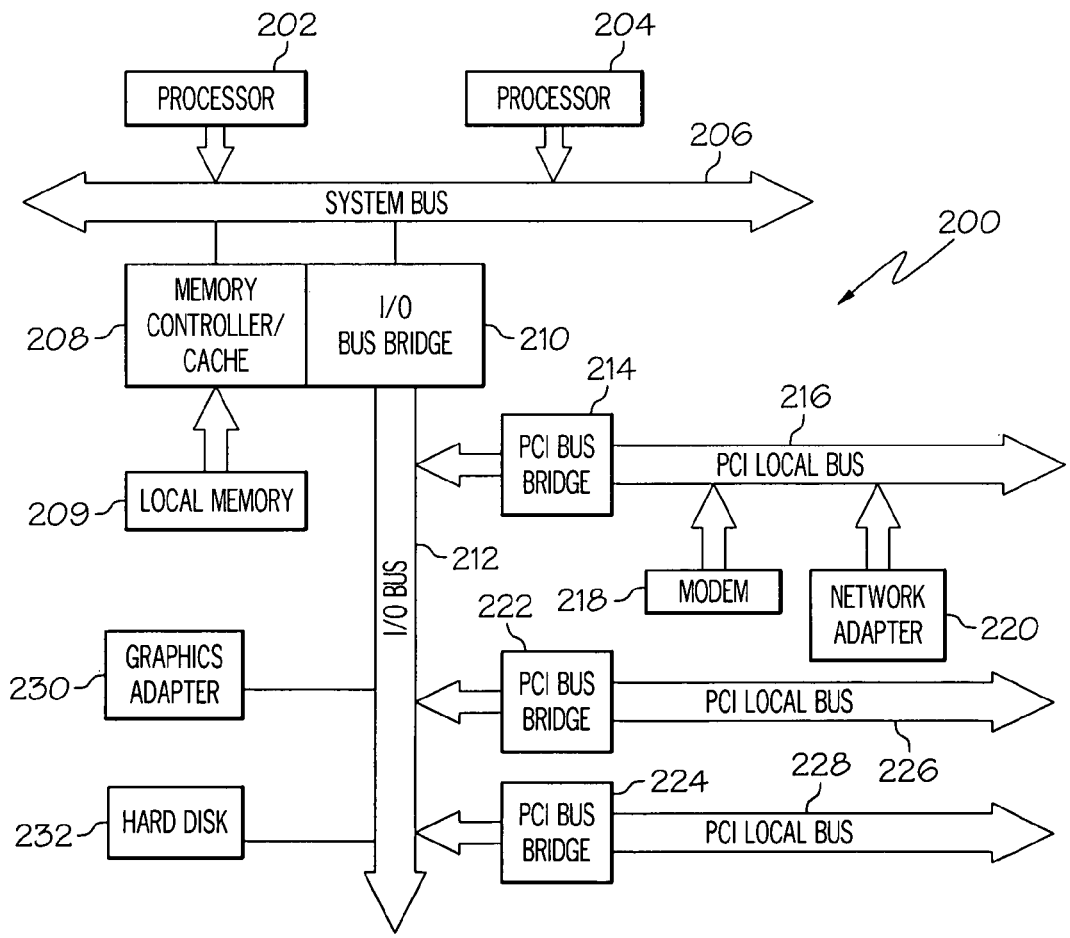
FIG. 2 is a block diagram of a data processing system that may be implemented as a server in accordance with an illustrative embodiment of the present invention.
Figure 3:
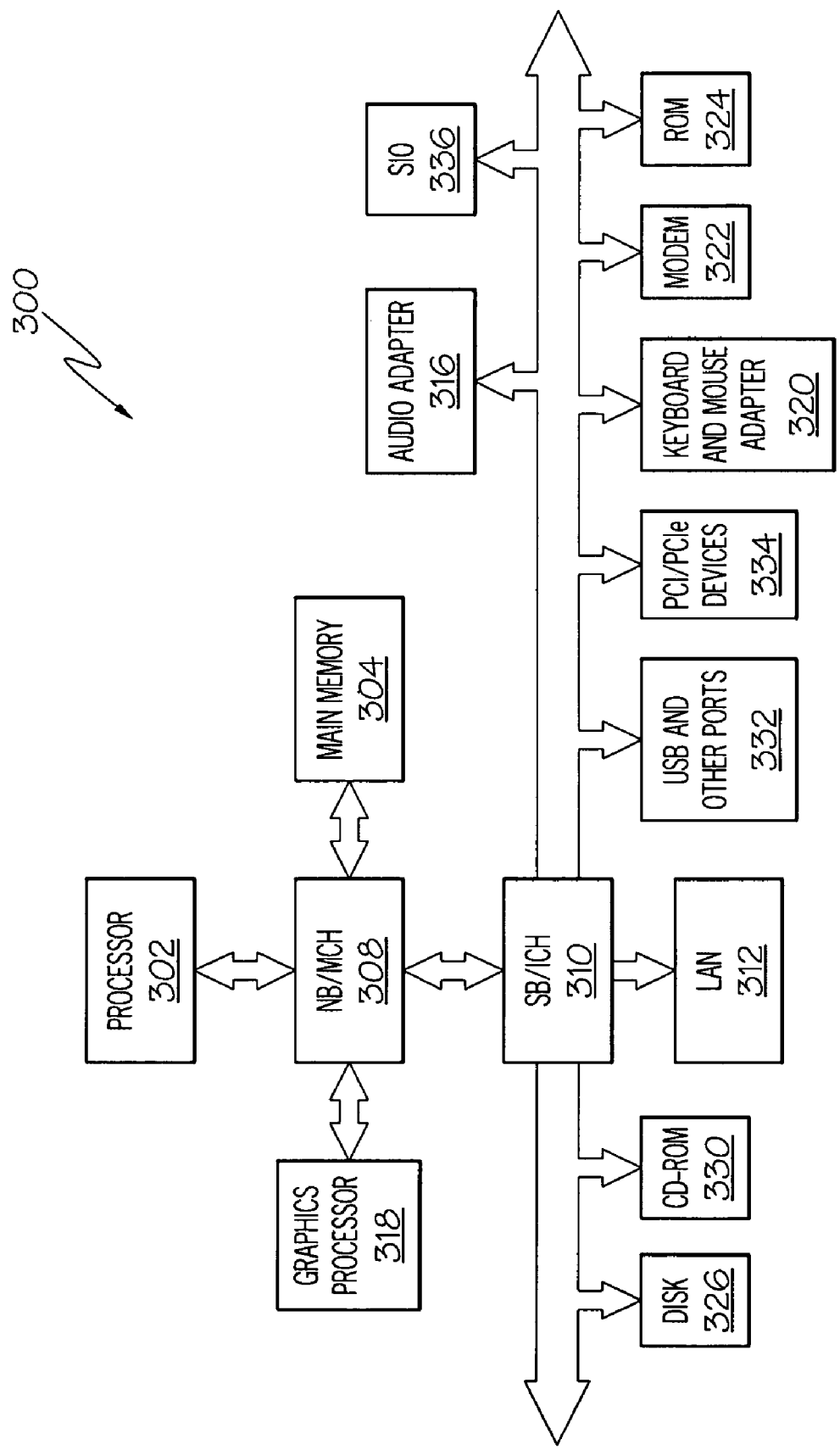
FIG. 3 is a block diagram of a data processing system in which an illustrative embodiment of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains a network 102, which is the medium used to provide communication links between various devices and computers connected together within network data processing system 100. Network 102 may include connections, such as wire, wireless communication links, or fiber optic cables.

In the depicted example, server 104 connects to network 102 along with storage unit 106. In addition, clients 108, 110, and 112 connect to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 that connect to system bus 206. Alternatively, a single processor system may be employed. Also connected to system bus 206 is memory controller/cache 208, which provides an interface to local memory 209. I/O bus bridge 210 connects to system bus 206 and provides an interface to I/O bus 212. Memory controller/cache 208 and I/O bus bridge 210 may be integrated as depicted.

Peripheral component interconnect (PCI) bus bridge 214 connects to I/O bus 212 provides an interface to PCI local bus 216. A number of modems may be connected to PCI local bus 216. Typical PCI bus implementations will support four PCI expansion slots or add-in connectors. Communication links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® computer system, running the Advanced Interactive Executive (AIX®) operating system or the LINUX operating system (eServer, pSeries and AIX are trademarks of International Business Machines Corporation in the United States, other countries, or both while LINUX is a trademark of Linus Torvalds in the United States, other countries, or both).

With reference now to FIG. 3, a block diagram of a data processing system is shown in which aspects of the present invention may be implemented. Data processing system 300 is an example of a computer, such as client 108 in FIG. 1, in which codes or instructions implementing the processes for embodiments of the present invention may be located. In the depicted example, data processing system 300 employs a hub architecture including a north bridge and memory controller hub (NB/MCH) 308 and a south bridge and input/output (I/O) controller hub (SB/ICH) 310. Processor 302, main memory 304, and graphics processor 318 are connected to NB/MCH 308. Graphics processor 318 may be connected to the MCH through an accelerated graphics port (AGP), for example. In the depicted example, local area network (LAN) adapter 312, audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 310. PCI/PCIe devices may include, for example, Ethernet adapters, add-in cards, PC cards for notebook computers, etc. PCI uses a card bus controller, while PCIe does not. ROM 324 may be, for example, a flash binary input/output system (BIOS). HDD 326 and CD-ROM drive 330 may use, for example, an integrated drive electronics (IDE) or serial advanced technology attachment (SATA) interface. A super I/O (SIO) device 336 may be connected to SB/ICH 310.

An operating system runs on processor 302 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 300 (Java is a trademark of Sun Microsystems, Inc. in the United States, other countries, or both).

Instructions for the operating systems, the object-oriented programming systems, and applications or programs are located on storage devices, such as hard disk drive 326, and may be loaded into main memory 304 for execution by processor 302. The processes for embodiments of the present invention are performed by processor 302 using computer implemented instructions, which may be located in a memory such as, for example, main memory 304, ROM 324, or in one or more peripheral devices 326 and 330. These processes may be executed by any processing unit, which may contain one or more processors.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the present invention may be applied to a multiprocessor data processing system.

A bus system may be comprised of one or more buses, such as system bus 206, I/O bus 212 and PCI buses 216, 226 and 228 as shown in FIG. 2. Of course, the bus system may be implemented using any type of communication fabric or architecture that provides a transfer of data between different components or devices attached to the fabric or architecture. A communication unit may include one or more devices used to transmit and receive data, such as modem 218 or network adapter 220 of FIG. 2 or modem 322 or LAN 312 of FIG. 3. A memory may be, for example, local memory 209 or cache such as found in memory controller/cache 208 of FIG. 2 or main memory 304 of FIG. 3. A processing unit may include one or more processors or CPUs, such as processor 202 or processor 204 of FIG. 2 or processor 302 of FIG. 3. The depicted examples in FIGS. 1-3 and above-described examples are not meant to imply architectural limitations. For example, data processing system 300 also may be a tablet computer, laptop computer, or telephone device in addition to taking the form of a PDA.

The aspects of the present invention provide a computer implemented method, an apparatus, and a computer usable program product for configuring and modeling server connections in an enterprise tooling environment. In particular, the different aspects of the present invention may be implemented in a Java™ enterprise tooling environment. The processes of the present invention are performed by a processing unit that comprises one or more processors, such as processor 302 in FIG. 3, using computer implemented instructions, which may be located in a memory such as, for example, main memory 304, ROM 324, or in one or more peripheral devices 326 and 330 in FIG. 3. In an illustrative embodiment, the aspects of the present invention may be implemented using an application programming interface, such as Eclipse API, within an enterprise application development tool, such as Rational® Application Developer.

The aspects of present invention provide a software model that separates development time connection information from deployment or run time connection information. Development time connection information is information that is known at the time the enterprise application is developed and is used for connecting with the backend server. Examples of development time connection information include a name, a user id, a password, and a trace level for the server. At development time, an aspect of the present invention allows users to create, populate, and edit a connection object in the software model. At deployment or run time, an aspect of the present invention provides a deploy controller that uses the information collected in the connection object to locate, modify, or construct the corresponding deployment specification object and connection factory specification object to configure the backend server. A connection object includes deployment time connection information for a particular type of backend server. For example, a Siebel connection object includes deployment time connection information for a Siebel backend server. The connection object is a collection of connection objects representing deployment time connection information for different backend server types and deploy spec objects representing runtime connection information for the different backend server types.

Figure 4:
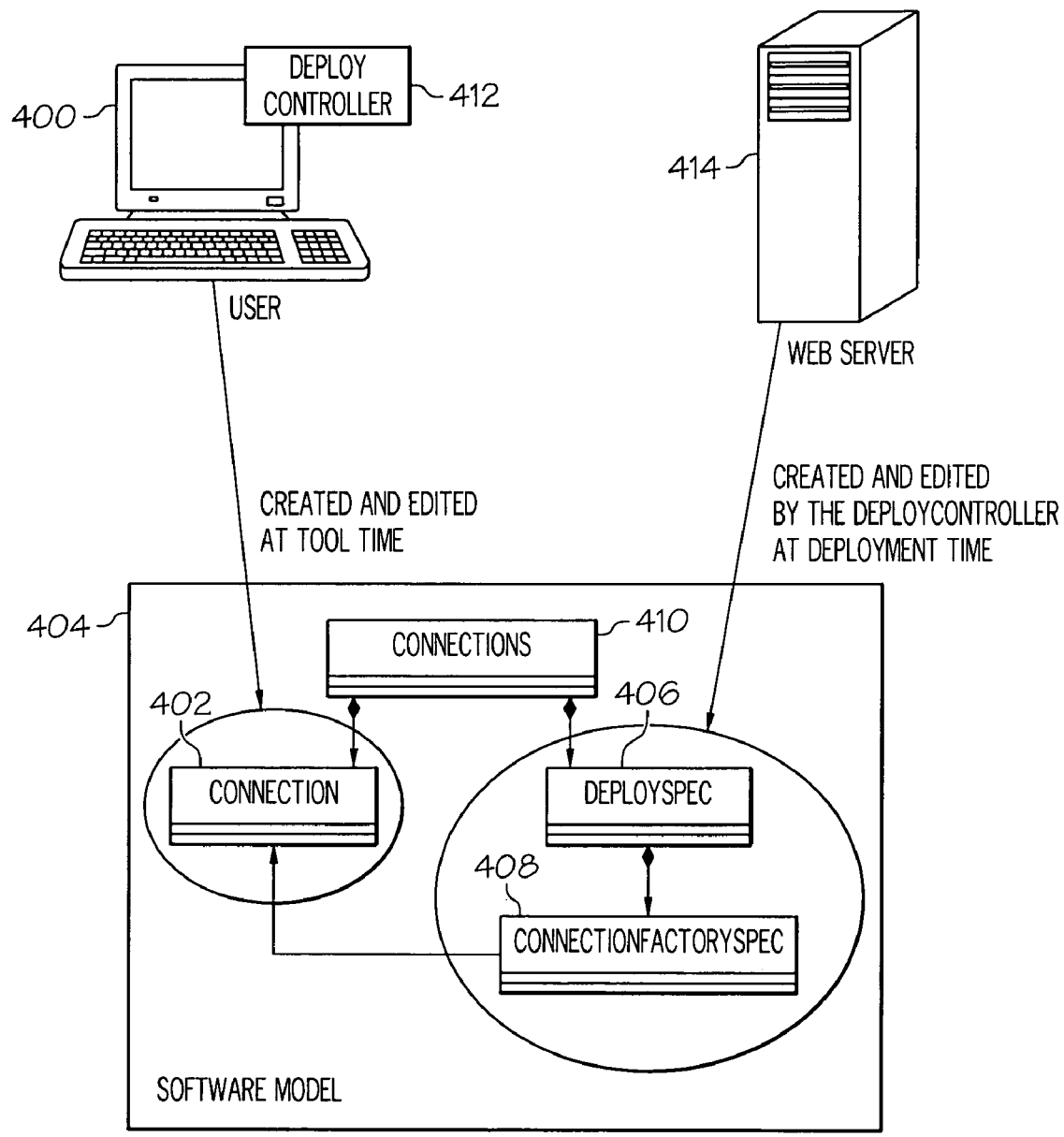
FIG. 4 is a diagram illustrating interactions between components for configuring and modeling server connection and deployment information in an enterprise tooling environment in accordance with an illustrative embodiment of the present invention.

Turning now to FIG. 4, a diagram illustrating interactions between components for configuring and modeling server connection and deployment information in an enterprise tooling environment is depicted in accordance with an illustrative embodiment of the present invention. As shown in FIG. 4, user 400 may create, populate, or edit connection object 402 provided within software model 404. Software model 404 may be implemented using an application programming interface, such as Eclipse API, within an enterprise application development tool. Connection object 402 includes attributes that are specific to a backend server. Once connection object 402 is created, edited, or populated, it is added to connections object 410. More details regarding software model 404 is discussed in FIG. 5.

At deployment time, the different illustrative examples of present invention provide deploy controller 412 that uses the information within connection object 402 to locate, modify, or construct the corresponding deployment specification object 406 and connection factory specification object 408. Deploy controller 412 may be implemented as a module within an enterprise tooling environment executed by user 400. After deployment specification object 406 and connection factory specification object 408 are filled, Java™ enterprise deployment information are written to configuration files in Web server 414.

Figure 5:
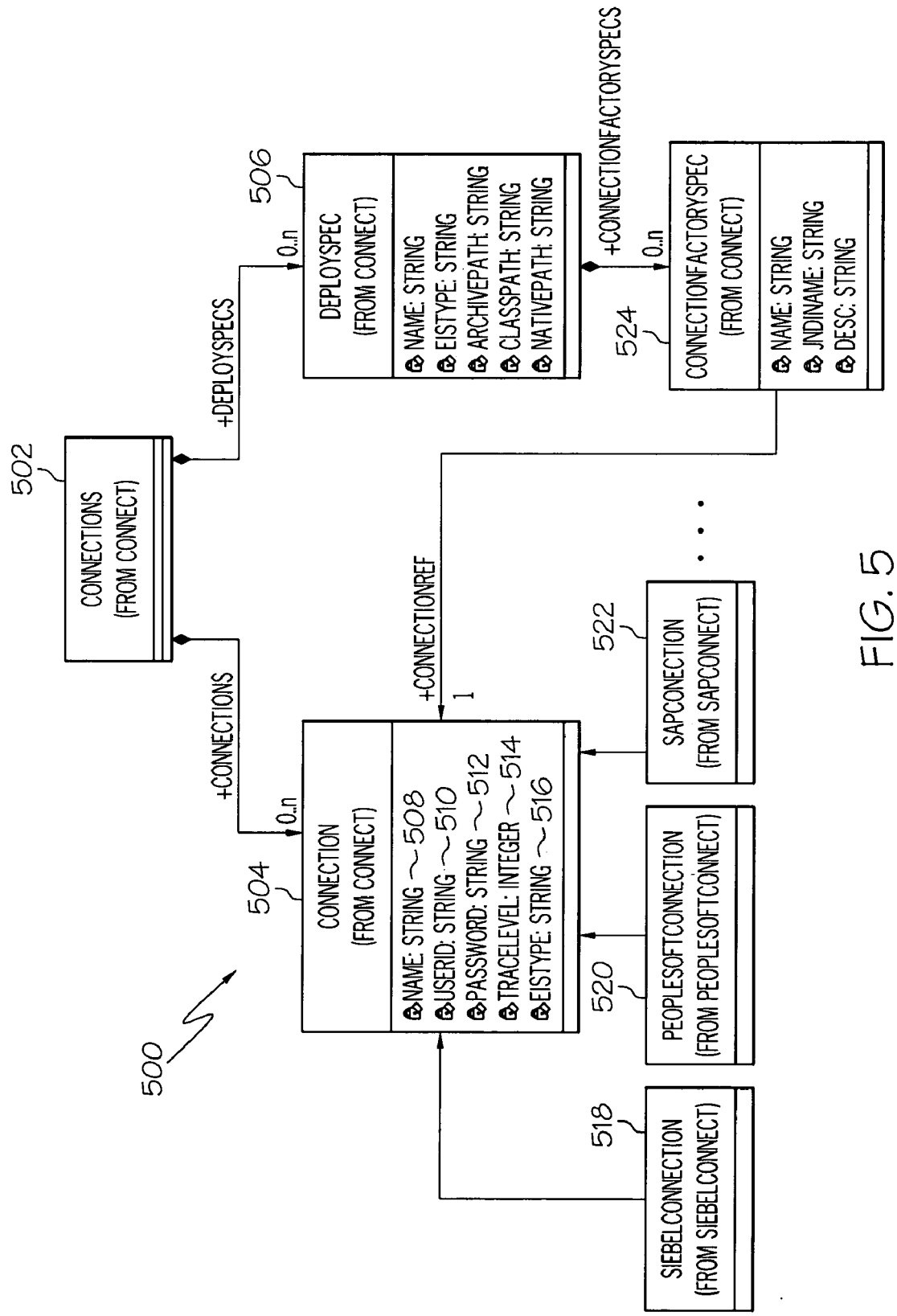
FIG. 5 is a class diagram depicting a software model for modeling server connections in an enterprise tooling environment in accordance with an illustrative embodiment of the present invention.

Turning now to FIG. 5, a class diagram depicting a software model for modeling server connections in an enterprise tooling environment is depicted in accordance with an illustrative embodiment of the present invention. FIG. 5 describes software model 404 in FIG. 4 in greater detail. As shown in FIG. 5, software model 500 includes "connections" object 502, which comprises zero or more "connection" objects 504 and zero or more deploy spec objects 506.

"Connection" object 504 includes development time server connection information, such as name 508, userID 510, password 512, traceLevel 514, and eisType 516. For each backend server type, a unique "connection" object with system specific attributes is created by subclassing "connection" object 504. In this example, there are three connection objects that subclass connection object 504: Siebel connection object 518 representing a Siebel backend server, PeopleSoft connection object 520 representing a PeopleSoft backend server, and SAP connection object 522 representing a SAP backend server.

Other backend server types may also be supported by subclassing "connection" object 504 without departing the scope and spirit of the present invention. Subclassing means creating a concrete instance of "connection" object 504 by inheriting from the object.

Deploy spec objects 506 capture run time specific connection information, for example, the class path of a Java™ enterprise module to be deployed at runtime, and are kept separate from development time information that is captured inside "connection" object 504. Deploy spec objects 506 are not instantiated until the application is deployed. At deployment time, the deploy controller examines development time connection information in "connection" object 504 in order to create deploy spec objects 506. Deploy spec objects 506 capture run time connection information and each deploy spec object includes zero or more connection factory spec objects 524. Connection factory spec objects 524 include run time information necessary to reference "connection" object 504.

Figure 6:
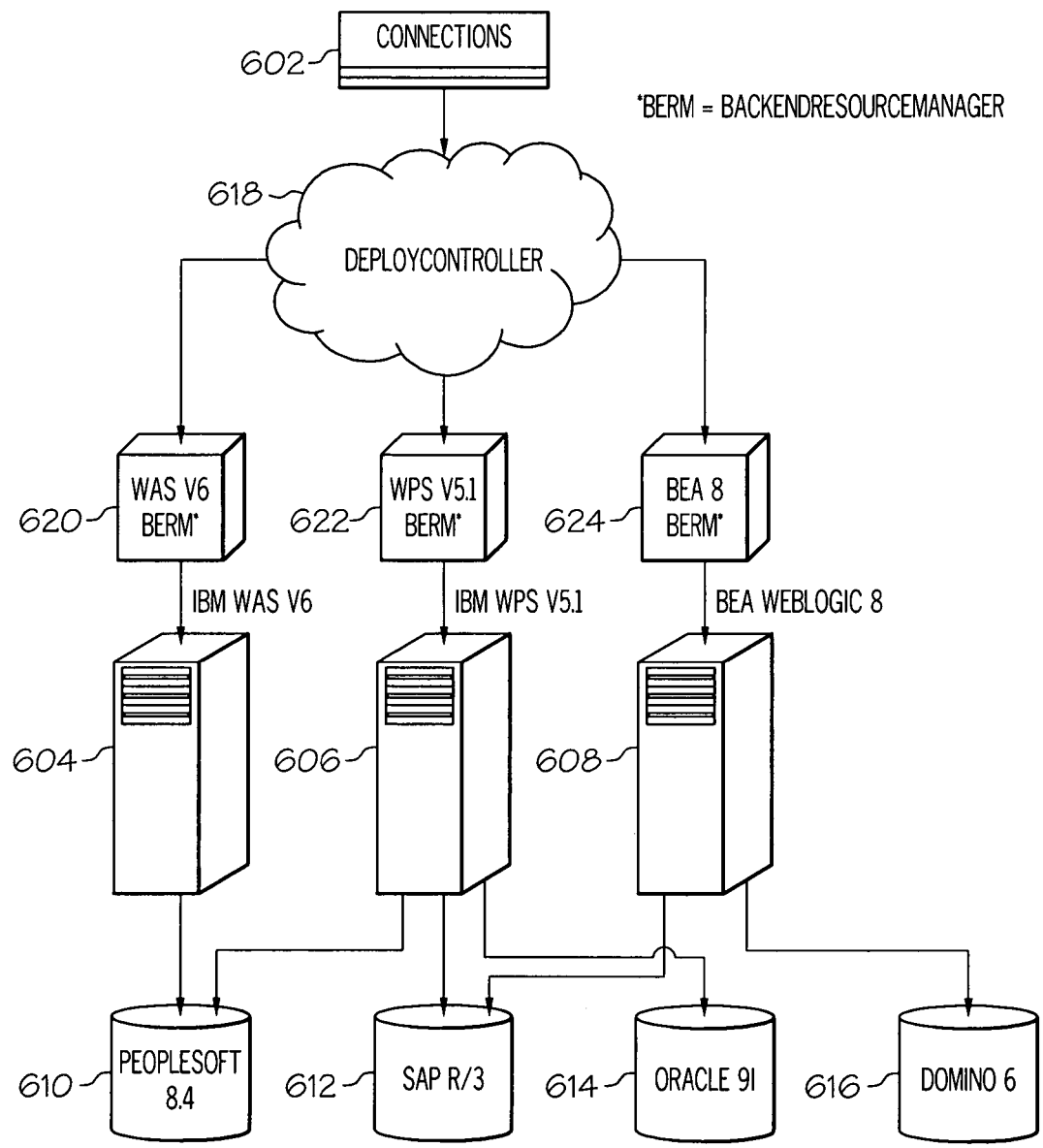
FIG. 6 is a diagram of an exemplary deployment scenario using the software model in accordance with an illustrative embodiment of the present invention.

Turning now to FIG. 6, a diagram of an exemplary deployment scenario using the software model in FIG. 5 is depicted in accordance with an illustrative embodiment of the present invention. As shown in FIG. 6, in this example scenario, "connections" object 602 are shared among three applications servers: IBM WebSphere® Application Server V6 604, IBM® WebSphere Portal V5.1 606, and BEA Weblogic 8 608. Application servers are servers in which enterprise applications are executed. IBM WebSphere® Application Server V6 604 and IBM® WebSphere Portal V5.1 606 are products available from International Business Machines Corporation. BEA Weblogic 8 608 is a product available from BEA Systems, Inc. The illustrated application servers are presented for purposes of depicting one example of the different embodiments of the present invention. The different aspects of the present invention may be implemented using any type and numbers of application servers.

IBM WebSphere® Application Server V6 604 is connected to PeopleSoft 8.4 backend server 610, while IBM® WebSphere Portal V5.1 606 is connected to PeopleSoft 8.4 backend server 610, SAP R/3 backend server 612 and Oracle 9i backend server 614. Backend servers are servers in which enterprise data or applications are stored. BEA Weblogic 8 608 is also connected to SAP R/3 backend server 612 as well as Domino® 6 backend server 616. PeopleSoft 8.4 610 and Oracle 9i 614 are products available from Oracle Corporation. SAP R/3 612 is a product available from SAP AG. Domino® 6 is a product available from International Business Machines Corporation.

Since application servers 604-608 connect to four different backend servers, four "connection" objects are used to capture development time connection information in this example. At deployment time, deploy controller 618 provided by an aspect of the present invention loads a backend resource manager (BERM) for each application server type and a connection interpreter for each backend server type. In this example scenario, WAS V6 BERM 620 is loaded for IBM WebSphere® Application Server V6 604, WPS V5.1 BERM 622 is loaded for IBM® WPS V5.1 606, and BEA 8 BERM 624 is loaded for BEA Weblogic 8 608.

Backend resource managers 620-624 are responsible for configuring application servers 604-608 with the needed resources to manager connections to backend servers 610-616 at runtime. Connection interpreters are used by the deploy controller to construct any needed deploy spec objects and connection factory spec objects. In addition, each connection interpreter transforms connection information collected at development time to run time connection information for the specific backend server type. For example, development time user Id may be called "username". At deployment time, connection interpreter transforms "username" to "userId" for a J2C resource adapter.

Figure 7:
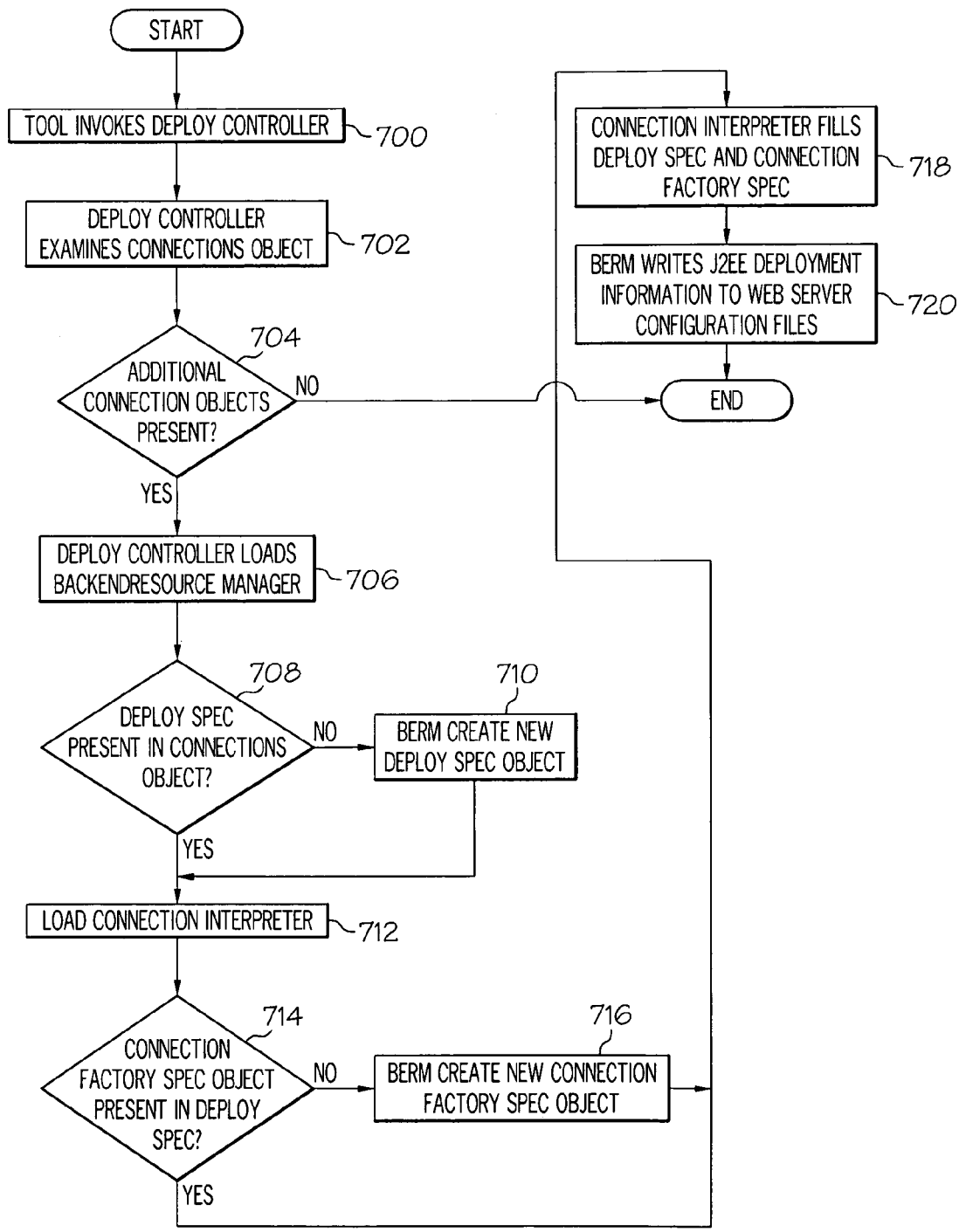
FIG. 7 is a flowchart of an exemplary process for configuring run time server connections in an enterprise tooling environment using a deploy controller in according with an illustrative embodiment of the present invention.

Turning now to FIG. 7, a flowchart of an exemplary process for configuring run time server connections in an enterprise tooling environment using a deploy controller is depicted in according with an illustrative embodiment of the present invention.

As shown in FIG. 7, the process begins when an enterprise application development tool invokes the deploy controller at deployment time (step 700). The deploy controller examines the "connections" object, which includes zero or more "connection" objects (step 702) and makes a determination as to whether additional "connection" objects are present (step 704). If no additional "connection" objects are present, the process terminates thereafter.

However, if additional "connection" objects are present, the deploy controller loads a backend resource manager for the given application server type (step 706), which examines the "connections" object and makes a determination as to whether a deploy spec object is present (step 708). If a deploy spec object is not present in the "connections" object, the backend resource manager creates a new deploy spec object (step 710) and continues to step 712.

If a deploy spec object is present in the "connections" object, the backend resource manager loads a connection interpreter for the backend server type (step 712). The connection interpreter transforms the development time connection model to a run time connection model.

The backend resource manager then examines the deploy spec object and makes a determination as to whether a connection factory spec object is present (step 714). If no connection factory spec object is present in the deploy spec object, the backend resource manager creates a new connection factory spec object (step 716) and continues to step 718.

If a connection factory spec object is present, the connection interpreter transforms development time connection information in the "connection" object to run time connection information and fills the deploy spec object and connection factory spec object with the run time connection information (step 718).

The connection interpreter performs the transformation by first determining a format of the run time connection information specific to the backend server type. The connection interpreter then translates the development time connection information in the connection object for the application server to a run time connection information format that is specific to that backend server type.

After the deploy spec and connection factory spec objects are filled, the backend resource manager writes enterprise deployment information to Web Server Configuration files (step 720) for deployment and the process terminates thereafter.

In summary, the different aspects of the present invention provide a software model that captures development time and run time server connection information. In addition, the aspects of the present invention provide a deploy controller that automatically transforms the development time server connection information to run time server connection information, such that the users are only required to configure server connections once. By using the aspects of the present invention, application developers may enable a new backend server by simply subclassing the connection object in the software model. In this way, users are separated from the concerns of setting up run time configurations when they are in the development phase.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or an apparatus or device) or a propagation medium. Examples of a computer-readable medium include a semiconductor or solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for configuring and modeling server information in an enterprise tooling environment, the computer implemented method comprising:
   determining whether at least one connection object is present in a connections object if the connections object is detected at deployment time, wherein each of the at least one connection object captures development time connection information specific to a backend server and wherein the connections object includes a plurality of connection objects and deploy spec objects; and
   if the at least one connection object is present, loading a backend resource manager specific to an application server, wherein the backend resource manager manages run time connections between the application server and the backend server.

2. The computer implemented method of claim 1, wherein the managing step for managing run time connections between the application server and the backend server comprises:
   determining if at least one deploy spec object is present in the connections object, wherein each of the at least one deploy spec object captures run time connection information specific to the backend server; and
   if the at least one deploy spec object is present, loading a connection interpreter specific to the backend server, wherein the connection interpreter transforms the development time connection information to run time connection information specific to the backend server.

3. The computer implemented method of claim 1, wherein the development time connection information is created, edited, or populated by a user at development time.

4. The computer implemented method of claim 1, wherein the determining and loading steps are performed by a deploy controller.

5. The computer implemented method of claim 2, wherein the transforming step comprises:
   determining a format of the run time connection information specific to the backend server; and
   translating the development time connection information in the at least one connection object to the format of the run time connection information specific to the backend server.

6. A data processing system for managing information in an enterprise tooling environment, the data processing system comprising:
   a bus,
   a storage device, wherein the storage device contains computer usable code;
   a communications unit connected to the bus; and
   a processing unit connected to the bus, wherein the processing unit executes the computer usable code to determine whether at least one connection object is present in a connections object if the connections object is detected at deployment time, wherein each of the at least one connection object captures development time connection information specific to a backend server and wherein the connections object includes a plurality of connection objects and deploy spec objects; and
   load a backend resource manager specific to an application server if the at least one connection object is present, wherein the backend resource manager manages run time connections between the application server and the backend server.

7. The data processing system of claim 6, wherein the processing unit, in executing the computer usable code to manage run time connections between the application server and the backend server if the at least one connection object is present, further executes the computer usable code to determine if at least one deploy spec object is present in the connections object, wherein each of the at least one deploy spec object captures run time connection information specific to the backend server; and
   load a connection interpreter specific to the backend server, wherein the connection interpreter transforms the development time connection information to run time connection information specific to the backend server if the at least one deploy spec object is present.

8. The data processing system of claim 7, wherein the processing unit, in executing the computer usable code to manage run time connections between the application server and the backend server if the at least one connection object is present, further executes the computer usable code to determine if at least one connection factory spec object is present in the at least one deploy spec object, wherein the at least one connection factory spec object captures references to the at least one connection object;
   fill the at least one deploy spec object and the at least one connection factory spec object with run time connection information specific to the backend server if the at least one connection factory spec object is present; and
   write the run time connection information to at least one configuration file of the application server.

9. The data processing system of claim 8, wherein the processing unit, in executing the computer usable code to manage run time connections between the application server and the backend server if the at least one connection object is present, further executes the computer usable code to create a new deploy spec object specific to the backend server if the at least one deploy spec object is absent; and
   create a new connection factory spec object for the at least one deploy spec object if the at least one connection factory spec object is absent.

10. The data processing system of claim 6, wherein the development time connection information is created, edited, or populated by a user at development time.

11. A computer program product comprising:
   a computer usable medium having computer usable program code for managing information in an enterprise tooling environment, the computer program product including:
   computer usable program code for determining whether at least one connection object is present in a connections object if the connections object is detected at deployment time, wherein each of the at least one connection object captures development time connection information specific to a backend server and wherein the connections object includes a plurality of connection objects and deploy spec objects; and
   computer usable program code for loading a backend resource manager specific to an application server, wherein the backend resource manager manages run time connections between the application server and the backend server if the at least one connection object is present.

12. The computer program product of claim 11, wherein the computer usable program code for managing run time connections between the application server and the backend server if the at least one connection object is present comprises:
   computer usable program code for determining if at least one deploy spec object is present in the connections object, wherein each of the at least one deploy spec object captures run time connection information specific to the backend server; and
   computer usable program code for loading a connection interpreter specific to the backend server if the at least one deploy spec object is present, wherein the connection interpreter transforms the development time connection information to run time connection information specific to the backend server.

13. The computer program product of claim 11, wherein the development time connection information is created, edited, or populated by a user at development time.

14. The computer program product of claim 12, wherein computer usable program code for transforming the development time connection information to run time connection information specific to the backend server if the at least one deploy spec object is present comprises:
   computer usable program code for determining a format of the run time connection information specific to the backend server; and
   computer usable program code for translating the development time connection information in the at least one connection object to the format of the run time connection information specific to the backend server.

* * * * *